Fig. 4

Nov. 4, 1969 G. HARTEL 3,476,096
FUEL SUPPLY SYSTEM FOR INTERNAL COMBUSTION ENGINES
Original Filed May 16, 1966 6 Sheets-Sheet 4

United States Patent Office 3,476,096
Patented Nov. 4, 1969

3,476,096
FUEL SUPPLY SYSTEM FOR INTERNAL COMBUSTION ENGINES
Gunter Hartel, Braunschweig, Germany, assignor to Professor Dr.-Ing. Kurt Lohner, Braunschweig, Germany
Continuation of application Ser. No. 550,511, May 16, 1966. This application Nov. 22, 1968, Ser. No. 781,690
Claims priority, application Germany, May 19, 1965, L 50,749
Int. Cl. F02d 1/06; F02m 7/00
U.S. Cl. 123—140                                    8 Claims

ABSTRACT OF THE DISCLOSURE

Fuel supply system for an internal combustion engine includes a control and distribution valve unit having two fuel chambers separated by a membrane and a throttle valve connected between and providing communication between the fuel chambers. A distribution valve is connected to an outlet of one of the chambers and a fuel pump supplies fuel under pressure to the chambers whereby fuel flows out of the outlet and through the distribution valve for distribution to cylinders of the internal combustion engine. Also provided is a space cam operatively engaging the throttle valve for adjusting the opening of the throttle valve, and two actuating mechanisms for adjustably displacing the space cam in direction of a respective dimension thereof, one of the actuating mechanisms being displaced in accordance with an adjusted setting of the inlet air manifold throttle of the internal combustion engine and the other of the actuating mechanisms being a pump operatively connected to the internal combustion engine and driven thereby at a speed depending on the operating conditions thereof.

---

This application is a continuation of application Ser. No. 550,511 filed May 16, 1966, entitled Fuel Supply System for Internal Combustion Engines, now abandoned.

This invention relates to fuel supply devices for multi-cylinder internal combustion engines, in which the fuel is supplied from a tank to a metering and distribution system, under pressure by a pump. The invention relates particularly to fuel supply devices of the kind in which the metering and distribution of the fuel is effected by a control and distribution valve which contains two fuel chambers separated by a membrane and connected together by a throttle in the form of a fixed jet. The fuel is fed by the pump to one chamber, flows to the other chamber, and on issuing from the other chamber is distributed by the distribution valve to ducts leading to the engine cylinders. The distribution valve is controlled by a membrane in dependence on the operating conditions of the engine. A membrane, which displaces the closure member of the distribution valve against the influence of a spring, is itself acted on by a second membrane, coupled to the first which separates the two chambers from each other. The first of these chambers is under atmoshperic pressure, whereas the second chamber contains the sub-atmospheric pressure which also prevails near a restriction in the air inlet manifold of the engine and varies according to the operating conditions of the engine.

With this arrangement the actuating force derived from pressure changes in the air inlet manifold is often insufficient to actuate effectively the first membrane and the part of the valve which is controlled by this membrane, a disadvantage which is particularly marked when the engine is turning slowly, because the actuating force provided in this way is too weak to overcome the unavoidable resistances encountered in moving the control members.

In fuel supply devices provided with control valves having moving parts manufactured to allow only small clearance between the sliding parts immersed in the stream of fuel there is always a risk, if the fuel contains substances tending to form gum, that the needles of needle valves, or other sliding parts, can become gummed up on their seats or guides, particularly after the engine has been left standing for a time, to the effect that when the engine is started up again and is still running at slow speed the actuating force supplied by the sub-atmospheric pressure in the air inlet manifold is not sufficient to free these parts again, or the actuating thrust supplied by the weak springs which oppose the force supplied by the sub-atmospheric pressure is not enough to free the parts.

In order to eliminate all these disadvantages and to provide a reliable metering of the fuel at all engine speeds, the present invention provides that in a fuel supply system for internal combustion engines, comprising a control and distribution valve containing two fuel chambers separated by a membrane and communicating through a throttle, fuel being supplied under pressure to one of the chambers by a fuel pump, and fuel flowing out of the other chamber being distributed through a part of the distribution valve, which is controlled by the membrane in dependence on engine operating conditions, to pipes which lead to the engine cylinders, the throttle through which the chambers communicate is formed by a valve which is opened and closed by a space cam, the space cam being displaceable to and fro in one direction by one actuating means in dependence on the setting of a throttle in the engine inlet manifold and being displaceable to and fro in another direction by a second actuating means in dependence on the operating conditions of the engine.

Preferably the first actuating means rotates the cam and the second actuating means moves the cam axially along the axis of rotation.

With this arrangement, the control valve which functions as the throttle to control the fuel flow, is acted on by the mechanical force which at the same time actuates the throttle valve in the air inlet mainifold, and this has the first advantage that the valve forming the throttle can be displaced independently of engine speed. A further advantage obtained by using a valve as a throttle in this way is that the difference between the fuel pressures on the two sides of the valve remains constant, where if a non-adjustable throttle is used the pressure difference on the two sides of the throttle varies with the rate of flow. The advantage here is that the actuating forces available for influencing the distributor valve remain constant over the entire range of engine operating conditions, and the actuating forces adjust themselves automatically to the value of the thrust applied to the closing member of the distributor valve by a spring acting on the membrane between the two chambers. Provided that one uses a sufficiently strong spring, for example a spring giving a thrust of about 3 kg. there will always be enough actuating force to displace the closing element in the distribution valve.

But in providing a space cam for operating the valve which forms the throttle, in order to control the flow of fuel in dependence on the engine operating conditions, satisfactory results cannot be obtained as long as the space cam is displaced in the one direction by the sub-atmospheric pressure in the air inlet manifold of the engine, or if it is displaced, in a manner which is also known by means of a centrifugal governor, because here again the engine cannot provide a sufficient actuating force at low speeds. According to a further feature of the invention therefore, the second actuating means is operated by fluid pressure provided by a pump which is arranged to be driven mechanically by the engine shaft at a speed dependent on that of the engine.

Although the pressure provided by a pump in this way depends on the engine speed, nevertheless the pressure required for moving a valve, even a stuck valve is certainly much less than that which can be obtained from the engine, even if the engine is only idling, or is being turned over by a starter motor. Moreover the engine driven pump can quite easily be designed to provide enough pressure to shift the control valve under any conditions.

This arrangement whereby the pressure provided by a mechanically driven pump is used for moving a control valve, by means of a space cam, in dependence on engine operating conditions, offers advantages not only in a distributor control of the kind described here, but also when applied to any other valve which is moved by two controlling forces by means of a space cam, irrespective of whether the fuel supply system involved is a single carburettor or a multiple carburettor system or a fuel injection system.

The simplicity and inexpensiveness of this arrangement and its reliability in operation also provide advantages compared with the known arrangement in which a space cam is moved in dependence on the engine operating conditions by a magnetic controller which consists essentially of a soft magnet which rotates with the engine shaft, and a permanent magnet which surrounds the soft magnet and is rotatable about the axis of the soft magnet, the permanent magnet being rotatable against the action of a spring so that the magnitude of its movement is dependent on the speed of the soft magnet and the rotation of the permanent magnet rotates the space cam.

Some examples of systems in accordance with the invention are illustrated in the accompanying drawings, in which:

FIGURE 4 is a graph showing the control pressure plotted against engine speed, as obtained by means of the system shown in FIGURE 3a.

Figures 1, 2:
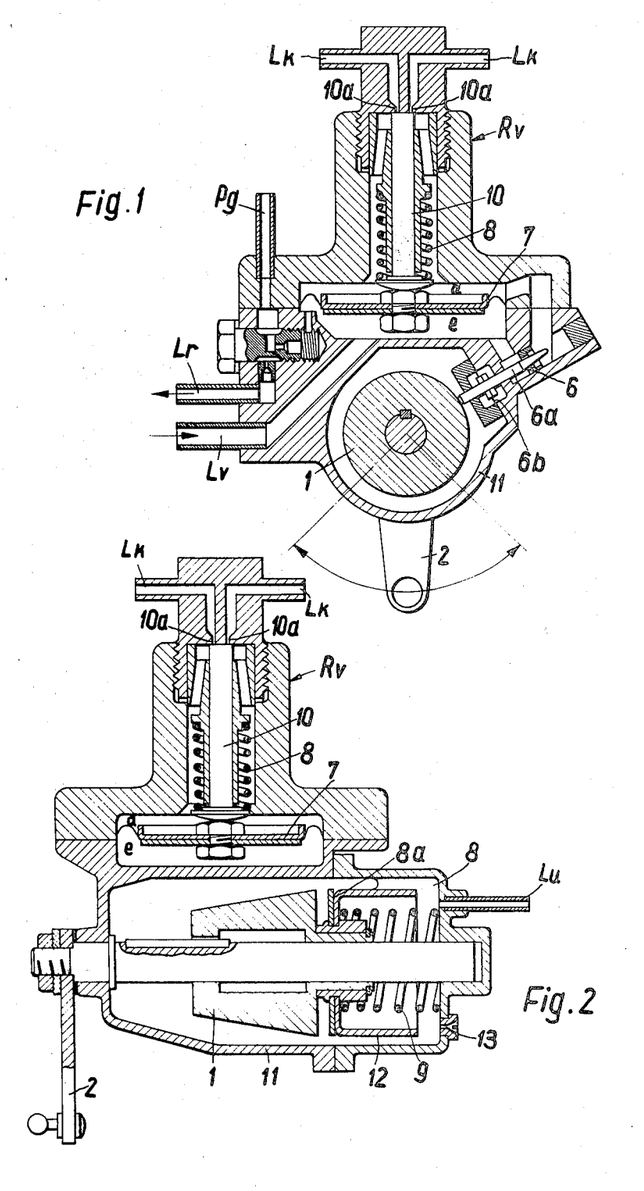
FIGURE 1 is a section through a control and distribution valve of a first system for a multi-cylinder internal combustion engine, the section being at right angles to the axis of the space cam.
FIGURE 2 is a section through the valve of FIGURE 1, the section being along the axis of the space cam.
Figures 3, 3A:
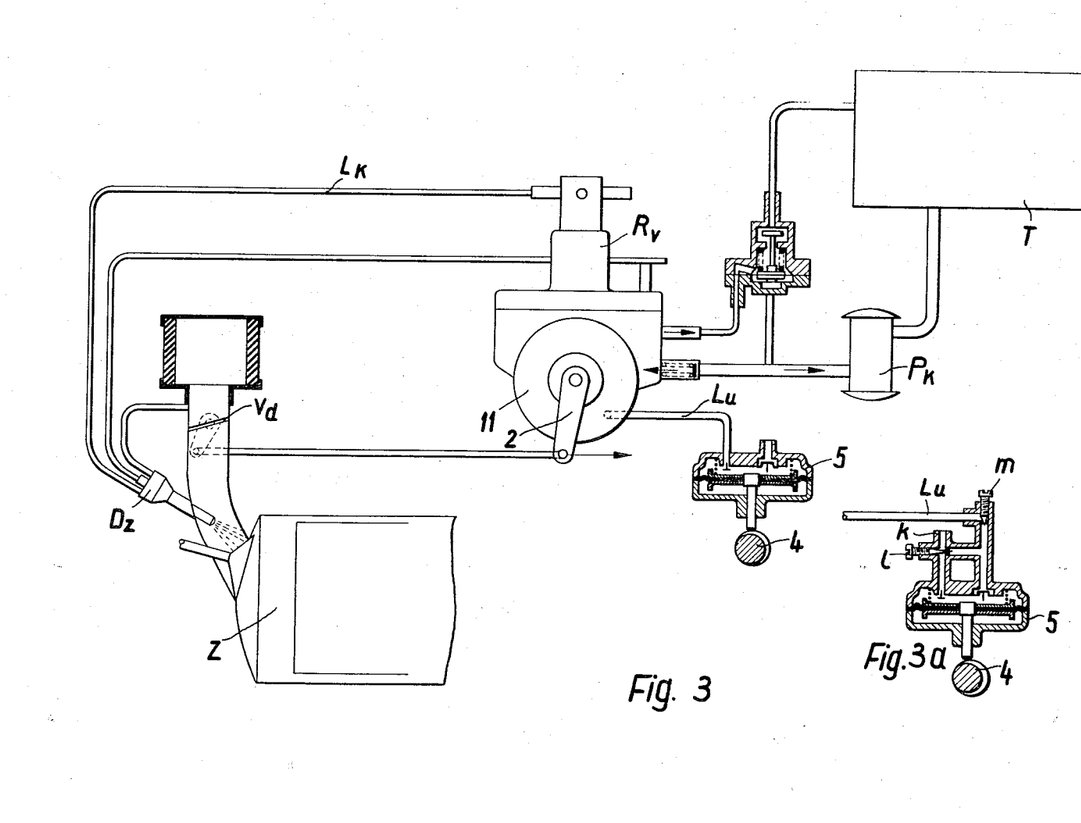
FIGURE 3 shows diagrammatically the complete fuel feeding system, including the control and distribution valve shown in FIGURES 1 and 2.
FIGURE 3a shows a modification of the system shown in FIGURE 3.

Referring to FIGURES 1 to 3, a needle valve 6, which is actuated by a space cam 1, is situated in the flow of fuel arriving from a tank T, through a fuel pump PK. After passing through the needle valve 6 the fuel flows to a control and distribution valve RV, in which a cylindrical closing element 10 is guided to move in a straight line. The distribution valve RV also contains distributor nozzles 10a and fuel pipes LK which take away the fuel, each fuel pipe LK conveying the fuel to a spray nozzle DZ for an individual cylinder Z. The element 10 is pushed by a spring 8 into contact with a membrane 7, which separates two chambers $a$ and $e$. These two chambers communicate through the needle valve 6, through which the fuel delivered under pressure by the pump PK into the chamber $e$ passes into the chamber $a$.

The needle 6a of the needle valve 6 is held constantly in contact with the surface of the space cam 1 by a resilient membrane 6b, which keeps the needle valve 6 almost closed when the system is at rest, that is to say when the throttle pedal of the vehicle is not depressed. The space cam 1 is mounted on a shaft 3 so that it can slide longitudinally but not rotate. The space cam 1 can be displaced independently by two different actuating forces, each of which opens the needle valve 6 to a greater or lesser degree. One of these actuating forces is derived from the torque applied to the throttle pedal. This torque at the same time actuates the throttle valve Vd. When the throttle pedal of the vehicle is moved a crank arm 2, mounted on the shaft 3 rotates the space cam. The second actuating force displaces the space cam 1 longitudinally along the shaft 3. In the example shown here this longitudinal displacement of the space cam is effected by a vacuum produced in the chamber 8 by a membrane pump 5 which is driven by a cam shaft 4 of the engine. A movable wall 8a of the chamber 8 is pushed against the space cam 1 by a spring 9 which surrounds the shaft 3. The movable wall 8a is connected to the housing 11, which contains the space cam 1, by a membrane 12. The chamber 8 is connected by a duct LU to the suction side of the pump 5, and is also connected to the atmosphere through a nozzle 13. A partial vacuum in the chamber 8 is eliminated gradually by air passing through the nozzle 13, that is to say the air flows in with a delayed action effect. The cross-section of the nozzle 13 determines the slope of the curve representing the amount of the partial vacuum in the chamber 8 in dependence on the engine speed. By modifying this cross-section the weakness or richness of the fuel and air mixture supplied to the engine can be adjusted in a simple way, for example to compensate for the difference between a cold starting and a warm starting of the engine. Moreover the nozzle 13, which communicates with the atmosphere, at the same time provides an automatic adaptation of the fuel feed to variations in atmospheric pressure due to weather or altitude conditions. When the atmospheric pressure changes the pressure in the chamber also changes proportionally, that is to say the needle valve 6 opens more or closes more and the mixture becomes richer or weaker to suit the existing requirements.

Alternatively it is of course quite possible to convey a gaseous or liquid medium, which supplies the actuating pressure, around a closed circuit between the pump 5 and the chamber 8, and to actuate the space cam 1 by a positive pressure instead of a partial vacuum. However actuation by positive pressure or sub-atmospheric pressure of air offers the advantage that the pump 5 is working against atmospheric pressure and the chamber 8 itself becomes filled with air from the outside, or discharges to the atmosphere and thus it is not necessary to provide a second connecting pipe between the pump 5 and the chamber 8.

Actuation of the needle valve by changes in air pressure also provides further advantages, as will be seen from FIGURE 3a. This figure shows the pipe LU connected to the delivery side of the pump 5, whereas the suction side of the pump is connected through a short duct K to the atmosphere. With this arrangement, in contrast to that of FIGURE 1, instead of aspirating constantly a stream of fresh air, which also contains dust, the same air circulates constantly within the pump. In this case the chamber 8 (FIGURE 2) is enclosed from the atmosphere. Instead of the nozzle 13, which is eliminated, we have as shown in FIGURE 3a a nozzle $l$ which connects the suction side of the pump 5 to the pressure side of the pump. The cross-section of this nozzle $l$ is represented in the drawing as variable. With this arrangement pressure changes cause only small amounts of air to reach the chamber 8 through the pipe LU which is provided with a throttle valve $m$ which, on the one hand, largely prevents pressure oscillations, but is mainly utilized to influence the rate of increase in the pump pressure as a function of engine speed, particularly at the higher engine speeds.

Figure 4:
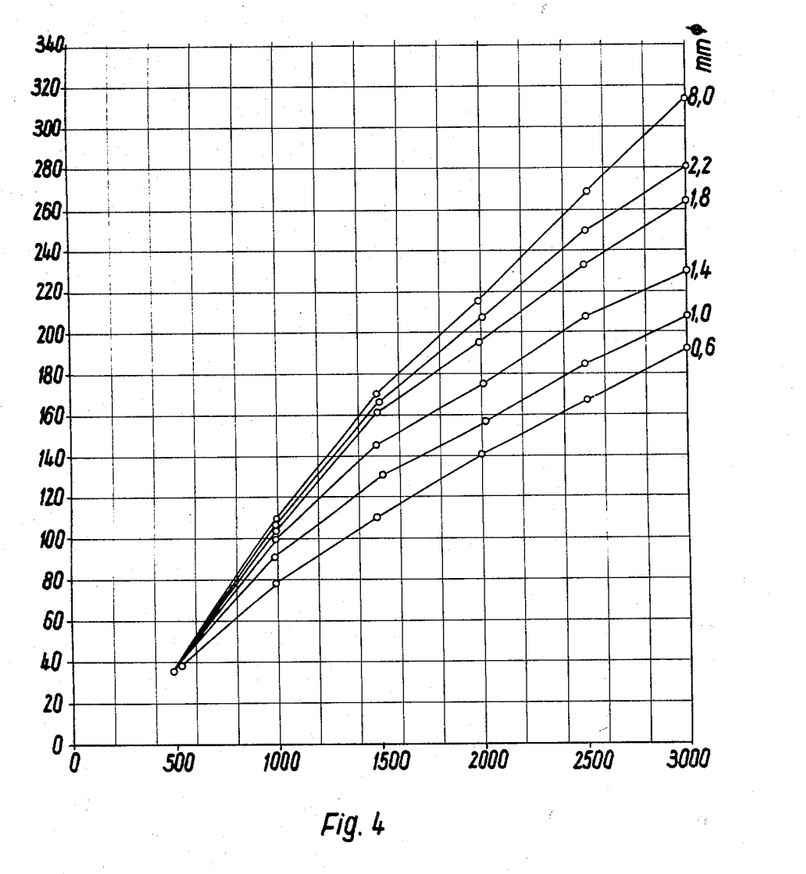

FIGURE 4 shows a bundle of curves derived from practical experience, showing how the pressure increase resulting from increasing engine speed depends on the cross-section of the nozzle $m$, for a given cross-section of the ventilating nozzle $l$. Furthermore, by varying the cross-section of the nozzle $l$, the bundle of curves can be shifted considerably upwards or downwards, with corresponding shifts in the position of the point of origin (lowest point). In this way it is possible by changing the adjustment nozzles $m$ and $l$, to adjust the bundle of curves as desired with great accuracy, to compensate for dimensional differences in the characteristics of the pump 5 arising from manufacturing or installation imperfections, which can never in practice be entirely eliminated or only at extra expense.

Figure 5:
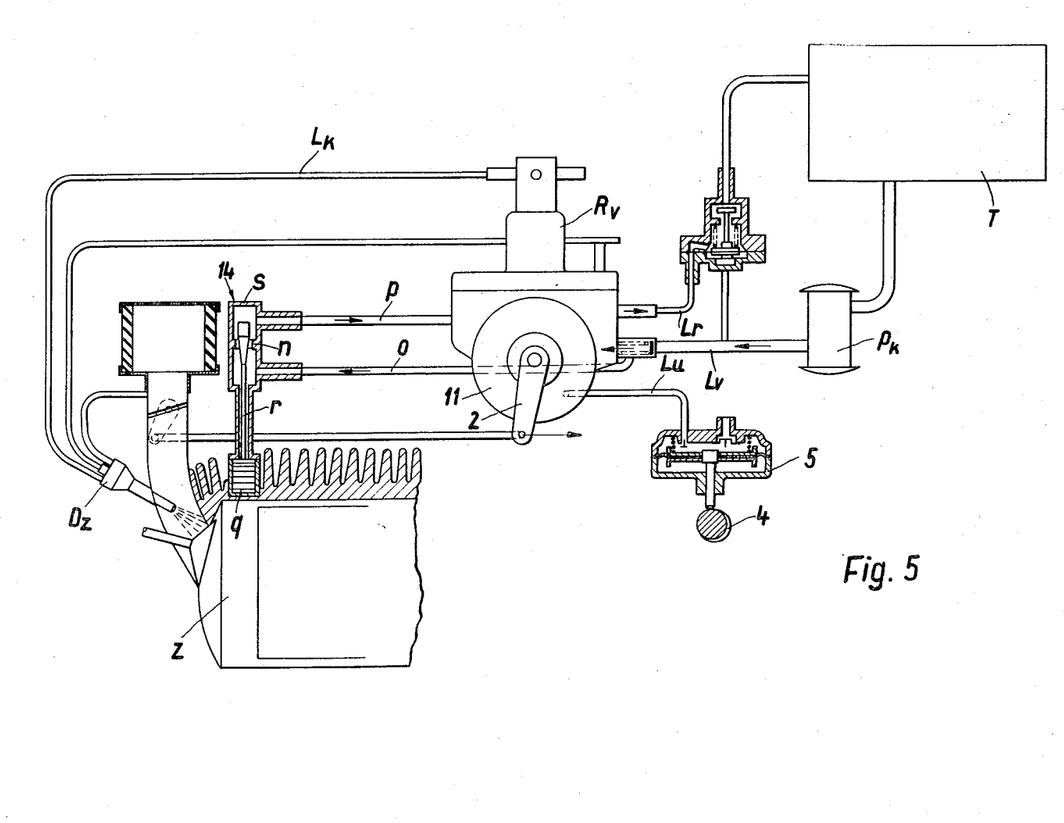
FIGURE 5 shows the system of FIGURE 3, but with the addition of an integral warming up device.
Figure 5A:
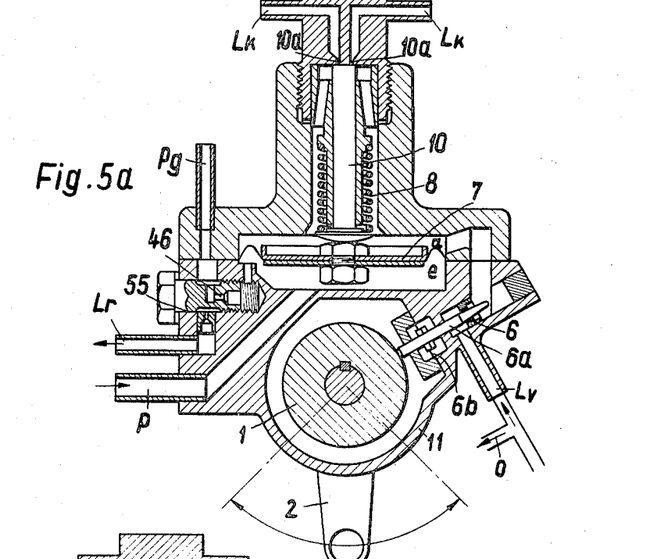
FIGURE 5a is a section similar to FIGURE 1 but showing a modified valve which forms part of the system shown in FIGURE 5.

An arrangement whereby the fuel flowing to the distribution valve RV as shown in FIGURES 1 and 2 is adjusted by the control valve 6 actuated by the space cam 1 and at the same time an automatic adjustment is effected in a comparatively simple way for the extra flow of fuel which the engine requires while warming up, and which gradually decreases as the engine becomes warm is shown in FIGURE 5. For this purpose, an auxiliary device 14 is provided, it consists essentially of an expanding element $q$, made of a thermally expanding substance, a needle valve $r$ connected to the element $q$, a housing $s$ containing these parts and having a port $n$ into which the needle $r$ projects, and pipe connections $p$ and $o$ on either side of the port $n$. The expanding element $q$ senses the engine temperature, corresponding to the operating conditions, and is for this purpose mounted, in the example shown in FIGURE 5, on a cylinder head 2 of the engine. The housing $s$ is connected through the pipe $o$ to the pipe LV through which fuel arrives from the fuel pump PK, and is also connected through the pipe $p$ to the fuel chamber $e$ of the distribution valve RV (see also FIGURE 5a). In contrast to the arrangement of FIGURE 1, the fuel chamber $e$ of the distribution valve RV of FIGURE 5a is not connected through the needle valve 6 to the fuel chamber $a$, but instead the fuel is supplied directly to the chamber $a$ from the fuel pipe LV through the valve 6. Excess fuel supplied to the chamber $e$ flows through return nozzles 46 and 55 and through the pipe LR back to the tank T.

The warming up device 14 shown in FIGURES 5 and 5a functions as follows:

As the engine cylinder Z gradually warms up, the expansion element $q$ pushes the needle $r$ gradually further upwards, increasing the open cross-section of the port $n$. As a result, the ratio of the cross-section of the port $n$ to the cross-sections of exchangeable jets 46 and 55 changes, with simultaneous changes in the pressure drops across the port $n$ and is the chamber $e$ relative to the delivery pressure of the fuel pump PK. With the fall in pressure in the chamber $e$ the pressure in the chamber $a$ also falls by the same amount, and consequently the pressure difference across the needle valve 6 becomes greater, with the result that the fuel supply to the engine cylinders Z is increased by an amount corresponding to the increase in pressure. When the port $n$ is fully open its open cross-section is greater than the cross-section of the jets 46, 45 by an amount such that the fuel pressure in the chamber $e$ is the same as the delivery pressure of the pump, that is to say when the engine cylinder has become warmed up to its normal operating temperature the pressure drop across the needle valve 6 of the control valve shown in FIGURE 5a is the same as it is in the valve shown in FIGURE 1, which has no warming up device.

The temporary increase in the pressure difference across the needle valve 6 provided by the warming up device is independent of the instantaneous position of the throttle pedal of the vehicle, and independent of the engine speed, and consequently the fractional enrichment of the mixture remains almost exactly the same over the entire range of the operating curves shown in FIGURE 4.

However, whereas in the absence of the warming up device described above the pressure drop across the needle valve 6 is determined exclusively by the thrust of the spring 8, and remains constant irrespective of the delivery pressure of the pump PK, provision of a warming up device causes this pressure drop to become dependent to a certain extent on the pump pressure. Nevertheless, any error resulting in the enrichment of the mixture due to fluctuations in the delivery pressure of the pump PK would be so small that they are not in practice disadvantageous.

Figure 6:
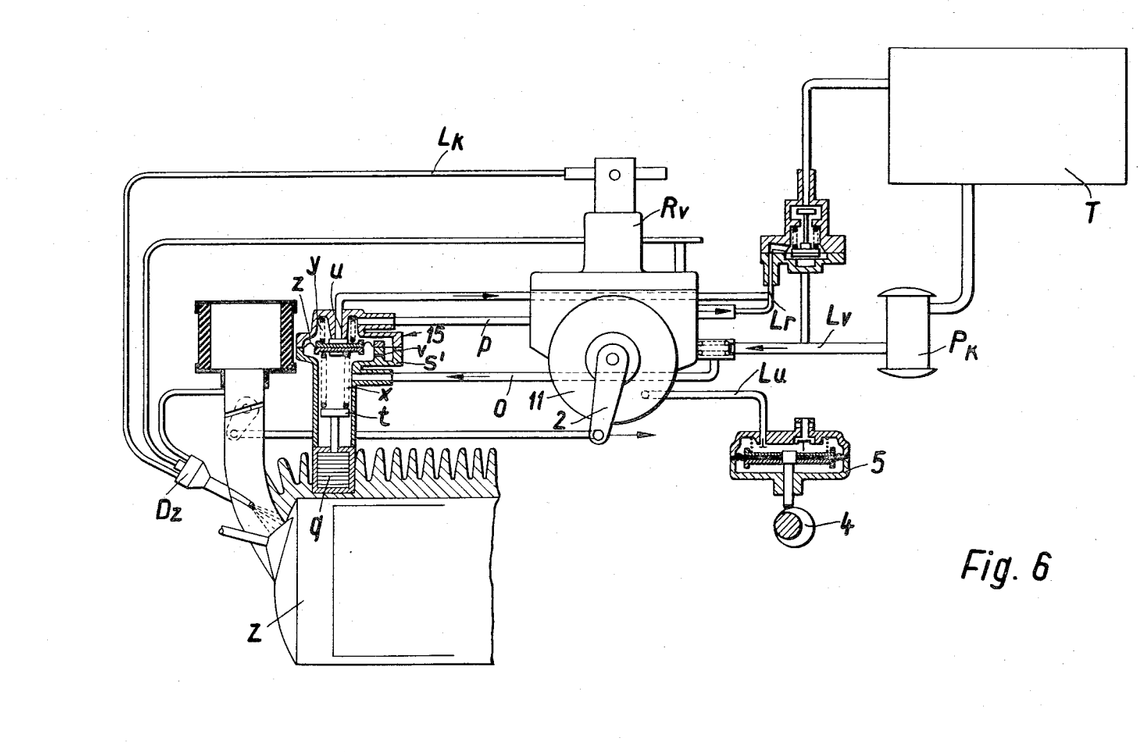
FIGURE 6 shows a system similar to FIGURE 5, but with a modified warming up device.

On the other hand, the enrichment of the mixture during warming up can be made quite independent of the pump pressure. An arrangement which does this is shown in detail in FIGURES 6 and 6a.

Here again there is a temperature sensitive element which, acting through a control valve, causes a decrease in the fuel pressure in the chambers $e$ and $a$ when the engine is cold and thus increases the pressure drop across the needle valve 6. The needle valve $n$ shown in FIGURE 5 is in this case replaced by a membrane controller comprising a valve closure member $u$, a control membrane $z$, two springs $x$ and $y$ which act on the membrane from opposite directions, and a throttle orifice $v$ in a housing $S'$, and there are also two connections for the pipes $o$ and $p$, which are connected to the housing $S'$ to either side of the membrane $z$ and the throttle orifice $v$.

Figure 6A:
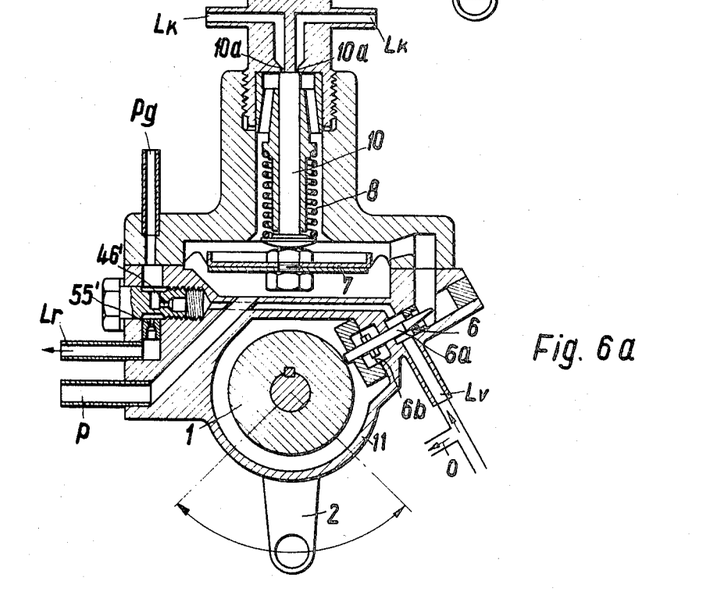
FIGURE 6a is a section similar to FIGURE 1, but showing a modified valve which forms part of the system shown in FIGURE 6.

FIGURE 6a shows how in this arrangement the fuel chamber $e$ is not connected to the return pipe LR through the throttles 46 and 55 as in FIGURE 5a, but instead only to the fuel feed pipe PV through the needle valve 6. Thus, the chamber $e$ forms a settling chamber. The fuel flowing through the pipes $o$ from the warming up device 15 reaches the chamber $e$ through the throttle orifice $v$, and through the valve $u$ in the return pipe LR, the flow through the valve $u$ being controlled by the membrane $z$. When the engine is cold, the spring $x$ is hardly compressed and provides less thrust than does the spring $y$ on the opposite side of the membrane $z$. The valve $u$ is therefore open and the fuel flowing through the throttle orifice $v$ into the space which contains the spring $y$ flows almost unimpeded through the valve $u$ into the tank T. The result of this is that, just as in the case of the warming up device shown in FIGURES 5 and 5a, a pressure drop occurs in the fuel chambers $e$ and $a$ of the distribution valve RV, the pressure drop across the needle valve 6 increases and more fuel is supplied to the cylinders of the engine. As the engine warms up the expansion element $q$ compresses the spring $x$ until this spring provides the same thrust as the spring $y$, or a greater thrust. When this occurs the valve $u$ is in the closed position and the fuel pump delivery pressure prevails in the pipe $p$ and also in the chamber $e$, this being the pressure both in the pipe LV and in front of the needle valve 6. Thus, when the expansion element $q$ is in its one end position that is when it is fully contracted, the mixture is enriched as required when starting up in very cold weather, whereas when the element $q$ is in its other end position, that is fully expanded, the mixture enrichment is zero, as required when the engine is at its normal operating temperature. Under circumstances between these two limits, the ratio of the thrust provided by the spring $x$ against that provided by the spring $y$ determines the pressure drop across the throttle orifice $v$ and thus the decrease in pressure in the chamber $e$ of the distribution valve RV.

I claim:

1. Fuel supply system for an internal combustion engine having a plurality of cylinders, an engine inlet air manifold and a throttle for adjusting the air inlet opening to the manifold, comprising a control and distribution valve unit having two fuel chambers, one of said chambers having a fuel outlet, a distribution valve connected to said outlet, a membrane separating said chambers, fuel passage means connecting said fuel chambers for providing communication therebetween, adjustable throttle means comprising a valve disposed in said passage means, fuel pump means for supplying fuel at given pressure to the other of said chambers and at throttled pressure through said throttle means into said one of said chambers and out of said outlet and through said distribution valve for distribution to the cylinders of the internal combustion engine, said distribution valve being operatively engaged by said membrane and being controllably actuated thereby for varying the distribution of fuel through said distribution valve in dependence on the pressure differential of the fuel in said chambers, space cam means operatively engaging said throttle valve for adjusting the opening of said throttle valve, first actuating means for adjustably displacing said space cam means in the direction of one given dimension thereof in accordance with an adjusted setting of the throttle for the engine inlet air manifold, and second actuating means for adjustably displacing said space cam means in the direction of another given dimension thereof, said second actuating means comprising a pump operatively connected to the internal combustion engine so as to be driven thereby at a speed dependent on the operating conditions thereof.

2. Fuel supply system according to claim 1, wherein said pump of said second actuating means is a membrane pump.

3. Fuel supply system according to claim 1, wherein said space cam means is substantially cylindrical and is rotatable about the axis thereof by said first actuating means, said space cam means being movable in the axial direction thereof by said second actuating means.

4. Fuel supply system according to claim 1, wherein the internal combustion engine has a driven shaft, said pump of said second actuating means being operatively connected to said driven shaft for exerting fluid pressure on said space cam means for moving the same.

5. Fuel supply system for an internal combustion engine having a plurality of cylinders, an engine inlet air manifold and a throttle for adjusting the air inlet opening to the manifold, comprising a control and distribution valve unit having two fuel chambers, one of said chambers having an outlet, a membrane separating said chambers, and throttle means comprising a valve connected between said fuel chambers so as to provide communication therebetween, a distribution valve connected to said outlet, fuel pump means for supplying fuel under pressure to said chambers whereby fuel flows out of said outlet and through said distribution valve for distribution to the cylinders of the internal combustion engine, space cam means operatively engaging said throttle valve for adjusting the opening of said throttle valve, first actuating means for adjustably displacing said space cam means in the direction of one given dimension thereof in accordance with an adjusted setting of the throttle for the engine inlet air manifold, and second actuating means for adjustably displacing said space cam means in the direction of another given dimension thereof, said second actuating means comprising a pump operatively connected to the internal combustion engine so as to be driven thereby at a speed dependent on the operating conditions thereof, said internal combustion engine having a driven shaft, said pump of said second actuating means being operatively connected to said driven shaft for exerting fluid pressure on said space cam means for moving the same, and including a chamber having a movable wall connected to said space cam means, said pump of said second actuating means being connected to said chamber for supplying fluid pressure thereto, said chamber having a nozzle opening and communicating therethrough with the atmosphere.

6. Fuel supply system according to claim 5, wherein said pump of said second actuating means has a delivery side and a suction side with a duct connecting said suction side to atmosphere, a first adjustable throttle valve being connected between said pump delivery side and said chamber having said movable wall, and a second adjustable throttle valve connecting said pump delivery side to said duct.

7. Fuel supply system for an internal combustion engine having a plurality of cylinders, an engine inlet air manifold and a throttle for adjusting the air inlet opening to the manifold, comprising a control and distribution valve unit having two fuel chambers, one of said chambers having an outlet, a membrane separating said chambers, and throttle means comprising a valve connected between said fuel chambers so as to provide communication therebetween, a distribution valve connected to said outlet, fuel pump means for supplying fuel under pressure to said chambers whereby fuel flows out of said outlet and through said distribution valve for distribution to the cylinders of the internal combustion engine, space cam means operatively engaging said throttle valve for adjusting the opening of said throttle valve, first actuating means for adjustably displacing said space cam means in the direction of one given dimension thereof in accordance with an adjusted setting of the throttle for the engine inlet air manifold, and second actuating means for adjustably displacing said space cam means in the direction of another given dimension thereof, said second actuating means comprising a pump operatively connected to the internal combustion engine so as to be driven thereby at a speed dependent on the operating conditions thereof, and wherein one of said fuel chambers is connected through said throttle valve directly to said fuel pump means, a further control valve connecting said fuel pump means to the other of said fuel chambers, throttle jet means connecting said other of said fuel chambers to a fuel tank, said further control valve comprising a valve closure member and a thermally expansible element operatively connected therewith, said thermally expansible element being responsive to heat generated in the internal combustion engine by expanding and thereby moving said valve closure member so as to open said further control valve to a flow area therethrough greater than the flow area through said throttle jet means.

8. Fuel supply system for an internal combustion engine having a plurality of cylinders, an engine inlet air manifold and a throttle for adjusting the air inlet opening to the manifold, comprising a control and distribution valve unit having two fuel chambers, one of said chambers having an outlet, a membrane separating said chambers, and throttle means comprising a valve connected between said fuel chambers so as to provide communication therebetween, a distribution valve connected to said outlet, fuel pump means for supplying fuel under pressure to said chambers whereby fuel flows out of said outlet and through said distribution valve for distribution to the cylinders of the internal combustion engine, space cam means operatively engaging said throttle valve for adjusting the opening of said throttle valve, first actuating means for adjustably displacing said space cam means in the direction of one given dimension thereof in accordance with an adjusted setting of the throttle for the engine inlet air manifold, and second actuating means for adjustably displacing said space cam means in the direction of another given dimension thereof, said second actuating means comprising a pump operatively connected to the internal combustion engine so as to be driven thereby at a speed dependent on the operating conditions thereof, and wherein one of said fuel chambers is connected through said throttle valve directly to said fuel pump means, throttle jet means connected between said fuel pump means and a fuel tank, a membrane controller connected between the other of said fuel chambers and said fuel pump means, and between said throttle jet means and said fuel tank, on the one hand, and said fuel pump means on the other hand, said membrane controller comprising a membrane, a pair of oppositely acting springs operatively engaging said membrane, and a thermally expansible element responsive to heat generated in the internal combustion engine operatively engageable with one of said springs for stressing the same to overcome the biasing force of the oppositely acting spring so as to close the connection in said membrane controller between said fuel pump means and said fuel tank whereby fuel flows through said membrane controller from said fuel pump means to the other of said fuel chambers.

References Cited

UNITED STATES PATENTS

| | | | |
|---|---|---|---|
| 3,126,879 | 3/1964 | Canfield | 123—140 |
| 3,140,702 | 7/1964 | Fishman | 123—140 |
| 3,336,912 | 8/1967 | Morris | 123—140 |

LAURENCE M. GOODRIDGE, Primary Examiner

U.S. Cl. X.R.

123—119, 139